(12) United States Patent
Beon et al.

(10) Patent No.: US 8,947,411 B2
(45) Date of Patent: Feb. 3, 2015

(54) SENSING DEVICE AND METHOD FOR SENSING IMAGE

(75) Inventors: Beong-Hun Beon, Hwaseong-si (KR); Kwang-Hyun Kim, Gunpo-si (KR); Dae Won Kim, Dongducheon-si (KR); Ji-Hoon Kim, Hwaseong-si (KR); Seung Beom Park, Seoul (KR); Na Young Shin, Seoul (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 190 days.

(21) Appl. No.: 13/600,970

(22) Filed: Aug. 31, 2012

(65) Prior Publication Data

US 2013/0278577 A1    Oct. 24, 2013

(30) Foreign Application Priority Data

Apr. 24, 2012    (KR) .................. 10-2012-0042546

(51) Int. Cl.
*G09G 5/00* (2006.01)
*G06F 3/038* (2013.01)

(52) U.S. Cl.
USPC .......................................... 345/207; 345/690

(58) Field of Classification Search
USPC ............... 345/87, 88, 102, 207, 690; 349/68; 250/338.1
See application file for complete search history.

(56) References Cited

U.S. PATENT DOCUMENTS

| | | |
|---|---|---|
| 6,690,422 B1 | 2/2004 | Daly et al. |
| 6,697,109 B1 | 2/2004 | Daly |
| 6,755,554 B2 | 6/2004 | Ohmae et al. |
| 8,466,902 B2* | 6/2013 | Boer et al. .................. 345/175 |
| 2004/0041786 A1 | 3/2004 | Inoue et al. |
| 2008/0074401 A1* | 3/2008 | Chung et al. ................. 345/175 |
| 2008/0122792 A1* | 5/2008 | Izadi et al. ................... 345/173 |
| 2009/0128508 A1* | 5/2009 | Sohn et al. ................... 345/173 |
| 2009/0231511 A1* | 9/2009 | Takahashi et al. ............. 349/61 |
| 2010/0207531 A1 | 8/2010 | Peker et al. |
| 2011/0012115 A1* | 1/2011 | Jeon et al. ..................... 257/59 |
| 2011/0018893 A1* | 1/2011 | Kim et al. .................... 345/589 |
| 2011/0032461 A1* | 2/2011 | Cho et al. .................... 349/116 |
| 2011/0057189 A1* | 3/2011 | Jeong et al. ................... 257/59 |
| 2011/0227878 A1* | 9/2011 | Makita ........................ 345/175 |
| 2011/0273404 A1* | 11/2011 | Noma et al. ................. 345/175 |
| 2012/0001878 A1* | 1/2012 | Kurokawa et al. ........... 345/204 |
| 2012/0085890 A1* | 4/2012 | Kurokawa ................. 250/208.2 |
| 2012/0262435 A1* | 10/2012 | Park et al. .................... 345/211 |

(Continued)

FOREIGN PATENT DOCUMENTS

| | | |
|---|---|---|
| JP | 2007-108383 | 4/2007 |
| KR | 1020050101060 A | 10/2005 |
| KR | 100970999 | 7/2010 |

(Continued)

*Primary Examiner* — Joe H Cheng
(74) *Attorney, Agent, or Firm* — F. Chau & Associates, LLC

(57) ABSTRACT

The sensing device is provided. A sensing device according to an exemplary embodiment of the present invention includes a lower panel, an upper panel facing the lower panel, a liquid crystal layer positioned between the lower panel and the upper panel, an infrared ray sensor formed in at least one of the lower panel and the upper panel, a visible light sensor formed in at least one of the lower panel and the upper panel, and a backlight device positioned at an outer surface of the lower panel, wherein the backlight device includes a plurality of light emitting members representing different colors and an infrared ray light emitting member.

19 Claims, 9 Drawing Sheets

(56) References Cited

U.S. PATENT DOCUMENTS

2013/0044092 A1* 2/2013 Park et al. .................... 345/207
2013/0056732 A1* 3/2013 Jung et al. ...................... 257/53

FOREIGN PATENT DOCUMENTS

KR 1020110009575 A 1/2011
KR 1020110011056 A * 2/2011

* cited by examiner

SENSING DEVICE AND METHOD FOR SENSING IMAGE

CROSS-REFERENCE TO RELATED APPLICATION

This application claims priority to Korean Patent Application No. 10-2012-0042546 filed in the Korean Intellectual Property Office on Apr. 24, 2012, the entire contents of which are herein incorporated by reference.

TECHNICAL FIELD

Embodiments of the present invention relate to a sensing device and a method for sensing an image.

DISCUSSION OF THE RELATED ART

A liquid crystal display (LCD) includes a pair of panels with field-generating electrodes, such as pixel electrodes and a common electrode, and a liquid crystal (LC) layer interposed between the two panels. The field-generating electrodes are applied with voltages so that electric fields are generated in the LC layer. The electric fields align LC molecules in the LC layer so that polarization of incident light is controlled, thereby resulting in an image.

There are liquid crystal displays that include a touch sensing function or an image sensing function. The conventional liquid crystal displays which realize the sensing function or the image sensing function through physical changes may have reduced reliability.

SUMMARY OF THE INVENTION

Embodiments of the present invention provide a sensing device sensing a color image and an image sensing method.

A sensing device according to an exemplary embodiment of the present invention includes a lower panel, an upper panel facing the lower panel, a liquid crystal layer positioned between the lower panel and the upper panel, an infrared ray sensor formed in at least one of the lower panel and the upper panel, a visible light sensor formed in at least one of the lower panel and the upper panel, and a backlight device positioned at an outer surface of the lower panel, wherein the backlight device includes a plurality of light emitting members representing different colors and an infrared ray light emitting member.

Neither the lower panel nor the upper panel may include a color filter.

The lower panel may include a pixel transistor.

The lower panel may include a black matrix, and the black matrix may overlap at least one of the infrared ray sensor or the visible light sensor.

The infrared ray sensor and the visible light sensor may be formed in the upper panel.

The plurality of light emitting members may include at least two of a red light emitting member, a blue light emitting member, a green light emitting member, a cyan light emitting member, a magenta light emitting member, or a yellow light emitting member.

Whether the subject is located in an image region may be determined by the infrared ray sensor.

The light emitting members emitting different colors may be time-divisionally driven.

The image data for each color may be obtained through the visible light sensor by driving the plurality of light emitting members.

One image may be formed by combining the image data for each color.

An image sensing method according to an exemplary embodiment of the present invention includes determining whether a subject is located in an image region, time-divisionally emitting different colors of light, obtaining image data for each of the colors, and combining the image data to form one image.

The method may be performed by a sensing device including a lower panel, an upper panel facing the lower panel, a liquid crystal layer positioned between the lower panel and the upper panel, an infrared ray sensor or a visible light sensor formed in at least one of the lower panel or the upper panel, a backlight device positioned at an outer surface of the lower panel and including a plurality of light emitting members configured to emit the different colors of light and an infrared ray light emitting member.

The sensing device may do not include a color filter.

The lower panel may include a pixel transistor.

The lower panel may include a black matrix, and the black matrix may overlap at least one of the infrared ray sensor or the visible light sensor.

The infrared ray sensor and the visible light sensor may be formed in the upper panel.

The plurality of light emitting members may include at least two of a red light emitting member, a blue light emitting member, a green light emitting member, a cyan light emitting member, a magenta light emitting member, or a yellow light emitting member.

The method may further include requesting the subject to be located in the image region when the subject is not located in the image region.

According to an embodiment, there is provided a sensing device including a lower panel, an upper panel facing the lower panel, a plurality of light sensors, wherein at least one of the light sensors are formed in at least one of the lower panel or the upper panel, and a plurality of light emitting members configured to emit different wavelengths of light, wherein the light emitting members are time-divisionally driven.

The light sensors may include at least one visible light sensor and at least one infrared ray sensor.

According to the exemplary embodiments of the present invention, color images are time-divisionally separated from each other, resulting in easy sensing current analysis. Accordingly, the color of the subject may be measured. No color filters are formed in the sensing device according to an embodiment of the present invention. Accordingly, there is no damage to an image of the subject, which may occur due to the dispersion agent included in color filters.

DETAILED DESCRIPTION OF THE EMBODIMENTS

Figure 1:
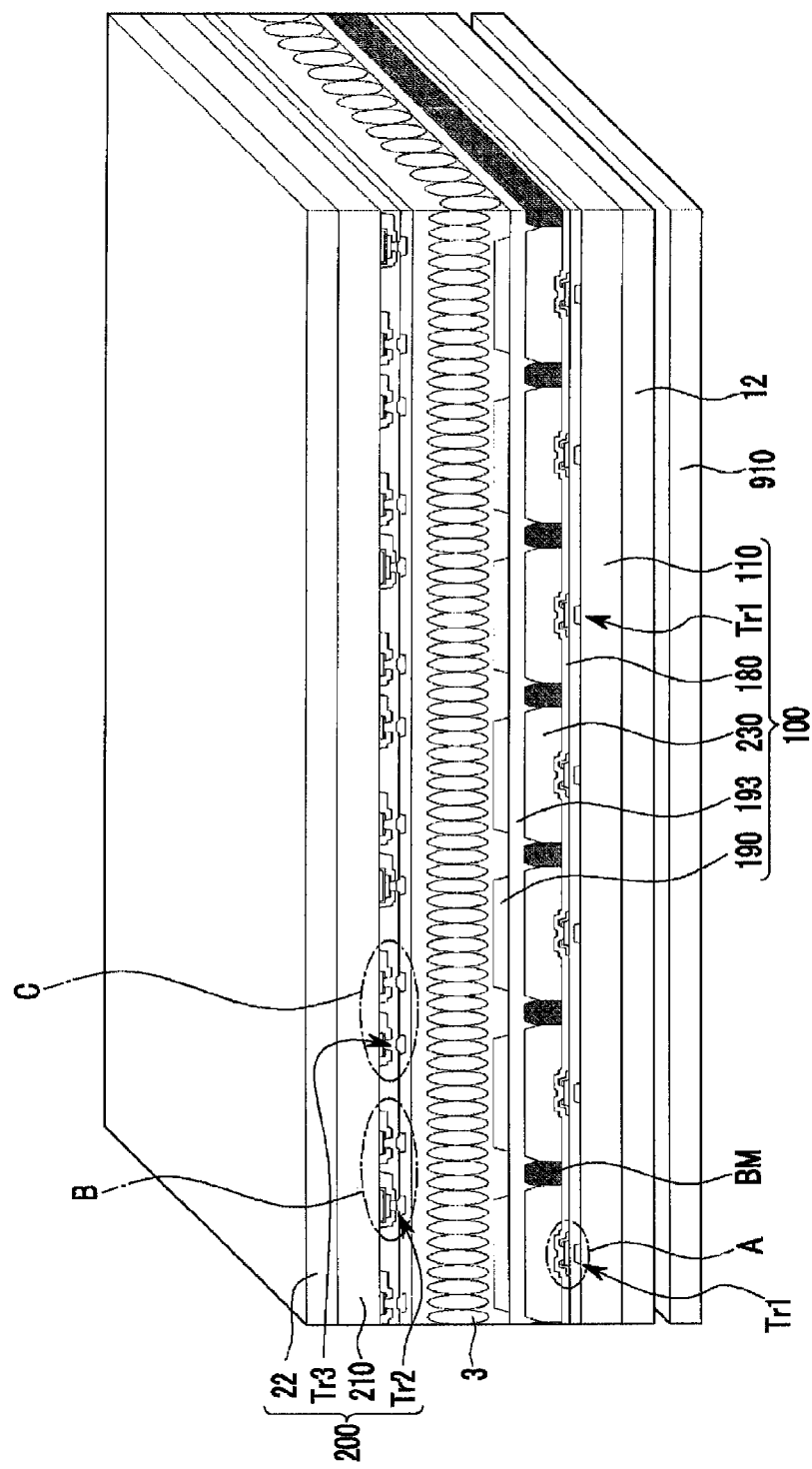
FIG. 1 to FIG. 8 are views for describing a sensing device according to an exemplary embodiment of the present invention.

Exemplary embodiments of the present invention will be described in detail with reference to the accompanying drawings. However, the present invention is not limited to exemplary embodiments described herein, and may be embodied in other forms.

In the drawings, the thickness of layers and regions may be exaggerated for clarity. It is to be noted that when a layer is referred to as being "on" another layer or substrate, it can be directly formed on another layer or substrate or can be formed on another layer or substrate through a third layer interposed therebetween. Like or similar constituent elements may be denoted by like reference numerals or characters throughout the specification and the drawings.

As used herein, the singular forms, "a," "an" and "the" are intended to include the plural forms as well, unless the context clearly indicates otherwise.

As will be appreciated by one skilled in the art, embodiments of the present invention may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

FIG. 1 to FIG. 7 are views for describing a sensing device according to an exemplary embodiment of the present invention.

Figure 2:
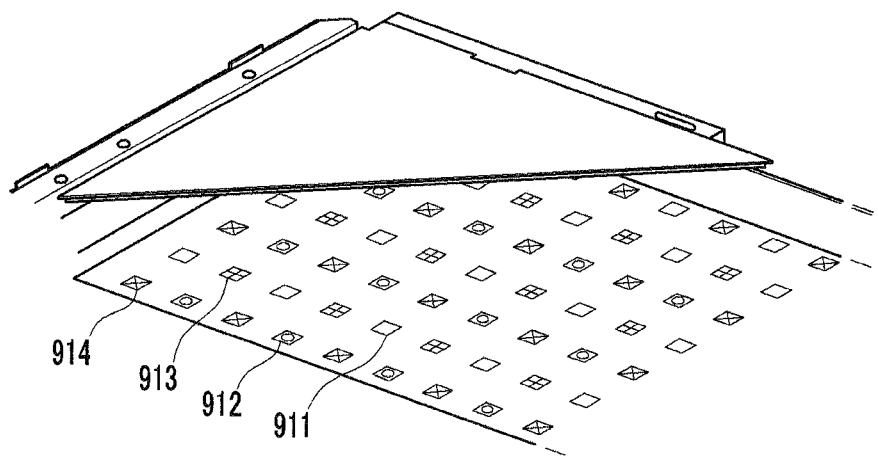
Figure 3:
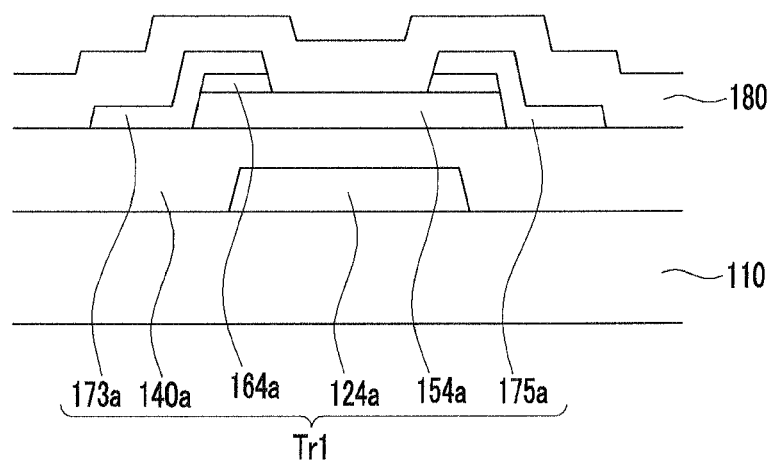
Figure 4:
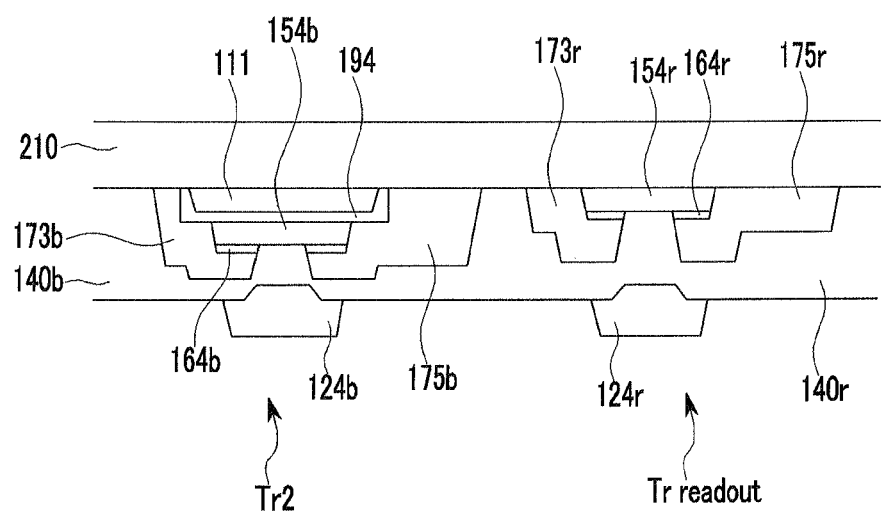
Figure 5:
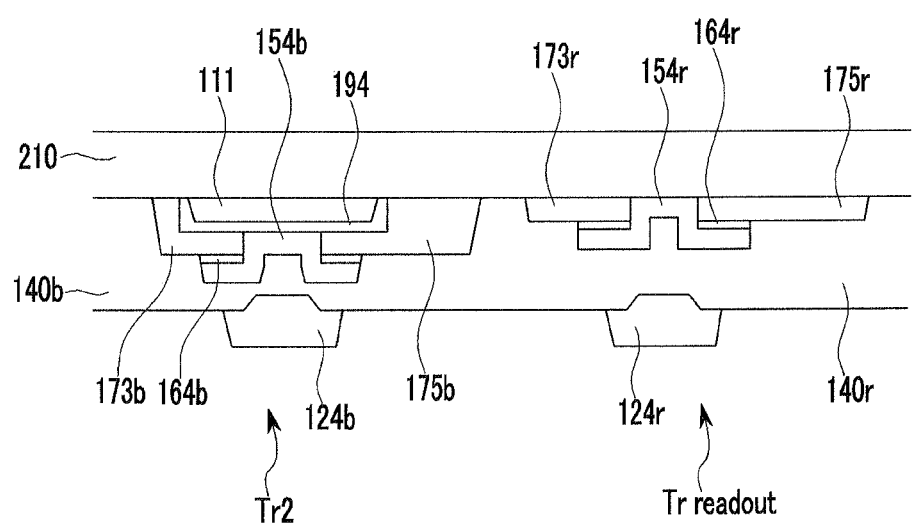
Figure 6:
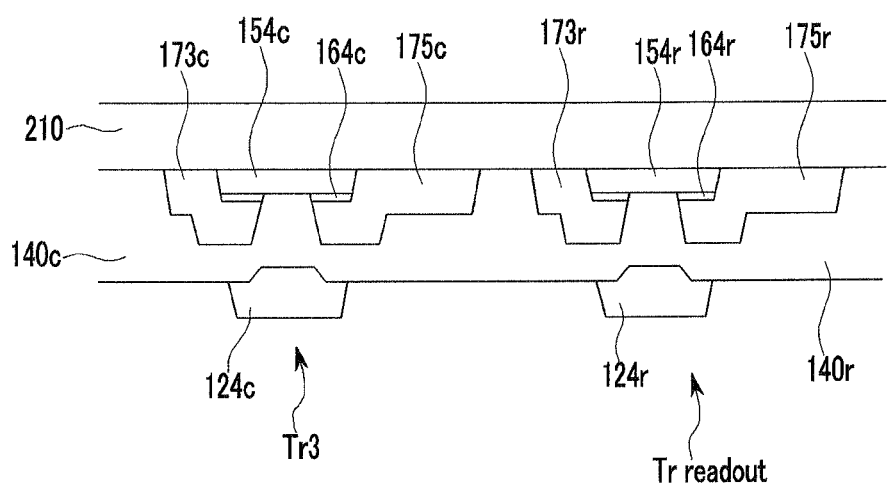
Figure 7:
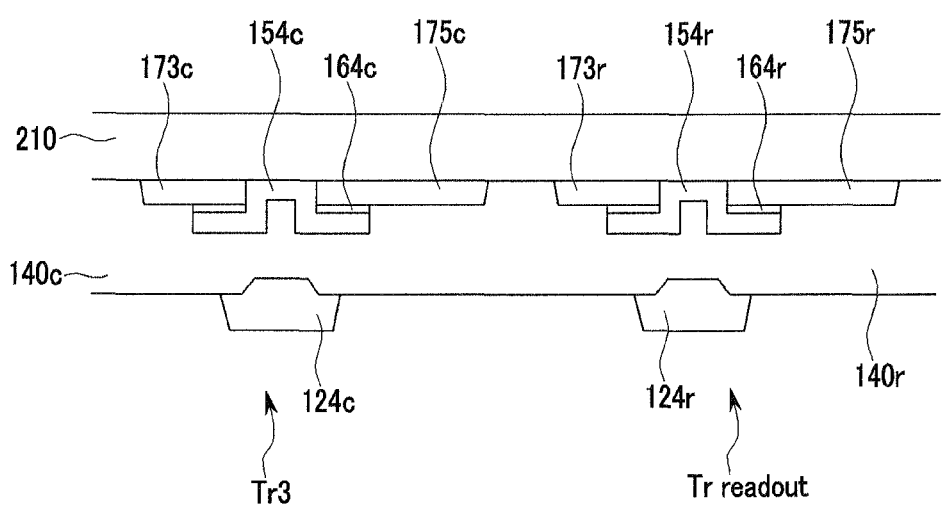

FIG. 1 is a perspective view for describing a sensing device according to an exemplary embodiment of the present invention. FIG. 2 is a partial cut-away perspective view illustrating the backlight unit shown in FIG. 1. FIG. 3 is an enlarged view illustrating a portion "A" of FIG. 1. FIGS. 4 and 5 are enlarged views illustrating a portion "B" of FIG. 1. FIGS. 6 and 7 are enlarged views illustrating a portion "C" of FIG. 1.

Referring to FIG. 1, a sensing device include a lower panel 100, a liquid crystal layer 3 positioned on the lower panel 100, and an upper panel 200 positioned on the liquid crystal layer 3.

The lower panel 100 includes a lower substrate 110 and a pixel transistor Tr1 positioned on the lower substrate 110. Referring to FIG. 3, which is an enlarged view of portion "A" of FIG. 1, the pixel transistor Tr1 is positioned in portion A, and the pixel transistor Tr1 include a gate electrode 124a, a gate insulating layer 140a positioned on the gate electrode 124a, a semiconductor layer 154a overlapping the gate electrode 124a on the gate insulating layer 140a, an ohmic contact layer 164a positioned on the semiconductor layer 154a, a source electrode 173a positioned on the ohmic contact layer 164a, and a drain electrode 175a positioned on the ohmic contact layer 164a to be separated from the source electrode 173a.

The lower panel 100 further includes a gate line positioned on the lower substrate 110 and a data line intersecting the gate line. The gate line is connected to the gate electrode 124a of the pixel transistor Tr1. The data line is connected to the source electrode 173a of the pixel transistor Tr1.

The lower panel 100 further includes a passivation layer 180 positioned on the pixel transistor Tr1, an organic layer 230 positioned on the passivation layer 180, a black matrix (BM) positioned within the organic layer 230, an insulating layer 193 positioned on the organic layer 230, and a pixel electrode 190 positioned on the insulating layer 193. The pixel electrode 190 is connected to the drain electrode 175a of the pixel transistor Tr1 and passes through the insulating layer 193 and the passivation layer 180. According to an embodiment, the organic layer 230 is omitted.

The lower panel 100 does not include a color filter. When an image of a subject is sensed, the image of the subject may be damaged by a dispersion agent included in the color filter when light generated from a backlight device 910 passes through the color filter. In an exemplary embodiment, no color filter is formed such that a pure color of a subject to be image-sensed may be prevented from being damaged by a noise caused by the dispersion agent of the color filter.

The upper panel 200 includes an upper substrate 210 and photosensitive elements Tr2 and Tr3. The photosensitive elements Tr2 and Tr3 include at least one infrared ray sensor Tr2 and at least one visible light sensor Tr3. The infrared ray sensor Tr2 and the visible light sensor Tr3 formed in the upper panel 200 overlap the black matrixes (BM) of the lower panel 100. The photosensitive elements Tr2 and Tr3 formed in the upper panel 200 and the black matrixes (BM) formed in the lower panel 100 vertically correspond to each other. Thus, the aperture ratio may be increased.

The infrared ray sensor Tr2 and the visible light sensor Tr3 are alternately arranged. Alternatively, the infrared ray sensor Tr2 and the visible light sensor Tr3 are disorderly or irregularly arranged. According to an embodiment, the infrared ray sensor Tr2 and the visible light sensor Tr3 are arranged with a predetermined ratio. According to an embodiment, a ratio of the number of the infrared ray sensors Tr2 to the number of the visible light sensors Tr3 is about 1:1 and the infrared ray sensors Tr2 and the visible light sensors Tr3 are alternately arranged.

The upper panel 200 further includes a readout line connected to the photosensitive elements Tr2 and Tr3 and a readout transistor $Tr_{readout}$ positioned between the photosensitive elements Tr2 and Tr3. A detecting signal from the photosensitive elements Tr2 and Tr3 passes through the readout line. The readout transistor $Tr_{readout}$ are adjacent to the photosensitive elements Tr2 and Tr3 at the same layer as the photosensitive elements Tr2 and Tr3.

The sensing device according to an exemplary embodiment further includes a backlight unit 910 positioned under the lower panel 100. Referring to FIG. 2 which is a partial cut-away perspective view of the backlight unit 910 shown in FIG. 1, the backlight unit 910 according to an exemplary embodiment includes visible light emitting members 911, 912, and 913 including a red light emitting member 911, a green light emitting member 912, a blue light emitting member 913, and at least one infrared ray light emitting member 914. The infrared ray light emitting member 914 and the visible light emitting members 911, 912, and 913 are dot-type light sources, such as light emitting diodes (LED). Infrared rays and visible light emitted from the infrared ray light emitting member 914 and the visible light emitting members 911, 912, and 913 are incident to the lower panel 100 substantially perpendicular to the lower panel 100.

In an exemplary embodiment, the visible light emitting members 911, 912, and 913 and the infrared ray light emitting member 914 are formed as direct types or as edge types. According to an embodiment, the visible light emitting members include a cyan light emitting member, a magenta light emitting member, and a yellow light emitting member.

The visible light emitting members 911, 912, and 913 and the infrared ray light emitting member 914 are uniformly distributed on an entire surface of the backlight unit 910 so that infrared rays and visible light are provided from the entire surface of the backlight unit 910. According to an embodiment, the visible light emitting members 911, 912, and 913 and the infrared ray light emitting member 914 are alternately arranged. Alternatively, the infrared ray light emitting member 914 and the visible light emitting members 911, 912, and 913 are disorderly or irregularly arranged. According to an embodiment, the number of the visible light emitting members 911, 912, and 913 and the number of the infrared ray light emitting members 914 have a predetermined ratio. For example, according to an embodiment, a ratio of the number of the visible light emitting members 911, 912, and 913 to the number of the infrared ray light emitting members 914 is about 1:1. However, the embodiments of the present invention are not limited thereto, and the ratio may change according to embodiments of the present invention.

For sensing an image of a subject positioned on the upper panel 200, in an exemplary embodiment, it is determined whether the subject is positioned on the upper panel 200 by using the infrared ray sensor Tr2. A region where the subject is located on the upper panel 200 is referred to as an image region.

After the position of the subject in the image region is verified, light emitting members emitting different colors of light, among a plurality of visible light emitting members 911, 912, and 913, are time-divisionally driven, and image data is obtained through the visible light sensor Tr3. For example, the red light emitting member 911 is driven and the visible light sensor Tr3 senses an image of the subject to thereby obtain first image data, the green light emitting member 912 is driven and the visible light sensor Tr3 senses the image of the subject to thereby obtain second image data, and then the blue light emitting member 913 is driven and the visible light sensor Tr3 senses the image of the subject to thereby obtain third image data.

The obtained first, second, and third image data are combined to form one image. In a conventional image sensing panel, an image is sensed by a method of detecting a sensing current according to a wavelength in the visible light region, however this method cannot divide colors of the subject from each other. According to an exemplary embodiment, a color image of the subject for time-division is correctly divided and image analysis is performed according to the divided color image such that the sensing current analysis according to time-division is easy. Accordingly, a color owned by the image of the subject may be sensed.

The infrared ray sensor Tr2 and the visible light sensor Tr3 are positioned under the upper substrate 210. Referring to FIG. 4 showing the enlarged infrared ray sensor Tr2 and readout transistor $Tr_{readout}$ positioned in the portion B of FIG. 1, the infrared ray sensor Tr2 is positioned under the upper substrate 210, and the readout transistor $Tr_{readout}$ electrically connected to the infrared ray sensor Tr2 is positioned at the same layer as the infrared ray sensor Tr2.

Specifically, the infrared ray sensor Tr2 includes an active layer 154b, an ohmic contact layer 164b, a source electrode 173b, a drain electrode 175b, a gate insulating layer 140b, and a gate electrode 124b.

The active layer 154b is positioned under the upper substrate 210. The active layer 154b includes at least one of amorphous germanium, amorphous silicon germanium, and micro-crystalline silicon. The ohmic contact layer 164b is positioned under the active layer 154b. The source electrode 173b is positioned under the ohmic contact layer 164b. The drain electrode 175b is separated from the source electrode 173b under the ohmic contact layer 164b. The gate insulating layer 140b is positioned under the active layer 154b, the source electrode 173b, and the drain electrode 175b. The gate electrode 124b overlaps the active layer 154b under the gate insulating layer 140b.

The infrared ray sensor Tr2 further includes a visible light blocking film 111 positioned to overlap the active layer 154b on the active layer 154b. Specifically, the visible light blocking film 111 is positioned between the upper substrate 210 and the active layer 154b. According to an embodiment, an insulating layer 194 including an insulating material, such as silicon nitride, is positioned between the visible light blocking film 111 and the active layer 154b.

The visible light blocking film 111 includes a material that blocks visible light provided from an outside source of the sensing device. For example, according to an embodiment, the visible light blocking film 111 includes an organic material or amorphous silicon including a black pigment.

The visible light blocking film 111 blocks visible rays that are incident to the display device from an outside source, resulting in an increase in a signal-to-noise ratio (SNR) and efficiently prevents influence of the visible rays by optimizing sensitivity of the active layer 154b including amorphous silicon germanium to an infrared ray region.

The readout transistor $Tr_{readout}$ includes a semiconductor layer 154r, an ohmic contact layer 164r, a source electrode 173r, a drain electrode 175r, a gate insulating layer 140r, and a gate electrode 124r.

The semiconductor layer 154r is positioned under the upper substrate 210. The ohmic contact layer 164r is positioned under the semiconductor layer 154r. The source electrode 173r is positioned under the ohmic contact layer 164r. The drain electrode 175r is separated from the source electrode 173r under the ohmic contact layer 164r. The gate insulating layer 140r is positioned under the semiconductor layer 154r, the source electrode 173r, and the drain electrode 175r. The gate electrode 124r is positioned under the gate insulating layer 140r and overlaps the semiconductor layer 154r.

FIG. 5 is a cross-sectional view enlarging an infrared ray sensor Tr2 and a readout transistor $Tr_{readout}$ according to an exemplary embodiment of the present invention.

The infrared ray sensor Tr2 and the readout transistor $Tr_{readout}$ shown in FIG. 5 are the same or substantially the same as the infrared ray sensor Tr2 and the readout transistor $Tr_{readout}$ of FIG. 4 except that the positional relationship is changed.

Referring to FIG. 5, the infrared ray sensor Tr2 is positioned under the upper substrate 210, and the readout transistor $Tr_{readout}$ electrically connected to the infrared ray sensor Tr2 is positioned at the same layer as the infrared ray sensor Tr2.

Specifically, the infrared ray sensor Tr2 includes the active layer 154b, the ohmic contact layer 164b, the source electrode 173b, the drain electrode 175b, the gate insulating layer 140b, and the gate electrode 124b.

The source electrode 173b and the drain electrode 175b are positioned under the upper substrate 210 and separated from each other. The active layer 154b is positioned under the source electrode 173b and the drain electrode 175b and overlaps the source electrode 173b and the drain electrode 175b.

The ohmic contact layer 164b is positioned between the active layer 154b and the source electrode 173b and between the active layer 154b and the drain electrode 175b.

The gate insulating layer 140b is positioned under the active layer 154b, the source electrode 173b, and the drain electrode 175b. The gate electrode 124b overlaps the active layer 154b under the gate insulating layer 140b.

The infrared ray sensor Tr2 further includes a visible light blocking film 111 positioned to overlap the active layer 154b on the active layer 154b. Specifically, the visible light blocking film 111 is positioned between the upper substrate 210 and the active layer 154b. The insulating layer 194 including an insulating material, such as silicon nitride, is positioned between the visible light blocking film 111 and the active layer 154b.

The readout transistor $Tr_{readout}$ includes the semiconductor layer 154r, the ohmic contact layer 164r, the source electrode 173r, the drain electrode 175r, the gate insulating layer 140r, and the gate electrode 124r.

The source electrode 173r and drain electrode 175r separated from each other are disposed under the upper substrate 210. The semiconductor layer 154r is disposed under the source electrode 173r and the drain electrode 175r and overlaps the source electrode 173r and the drain electrode 175r.

The ohmic contact layer 164r is disposed between the semiconductor layer 154r and the source electrode 173r and between the semiconductor layer 154r and the drain electrode 175r. The gate insulating layer 140r is disposed under the semiconductor layer 154r, the source electrode 173r, and the drain electrode 175r. The gate electrode 124r is disposed under the gate insulating layer 140r and overlaps the semiconductor layer 154r.

Referring to FIG. 6 which is an enlarged view of the visible ray sensor Tr3 and readout transistor $Tr_{readout}$ positioned in the portion "C" of FIG. 1, the visible ray sensor Tr3 is positioned under the upper substrate 210, and the readout transistor $Tr_{readout}$ electrically connected to the visible ray sensor Tr3 is disposed at the same layer as the visible ray sensor Tr3.

Specifically, the visible light sensor Tr3 includes an active layer 154c, an ohmic contact layer 164c, a source electrode 173c, a drain electrode 175c, a gate insulating layer 140c, and a gate electrode 124c.

The active layer 154c is positioned under the upper substrate 210 and includes the amorphous silicon. The ohmic contact layer 164c is positioned under the active layer 154c. The source electrode 173c is positioned under the ohmic contact layer 164c. The drain electrode 175c separated from the source electrode 173c is positioned under the ohmic contact layer 164c. The gate insulating layer 140c is positioned under the active layer 154c, the source electrode 173c, and the drain electrode 175c. The gate electrode 124c overlaps the active layer 154c under the gate insulating layer 140c. The readout transistor $Tr_{readout}$ is the same or substantially the same as the readout transistor $Tr_{readout}$ of FIG. 4.

In a liquid crystal display, all of the pixel transistor, the light emitting element, and the readout transistor may be formed in the lower panel. However, such structure may cause wiring of the lower panel to be complicated, thus resulting in a signal coupling between neighboring wired lines. Further, the photosensitive element is positioned in the lower panel such that light sensitivity is reduced, thus resulting in a decrease in sensing reliability.

However, in an exemplary embodiment, the light emitting elements Tr2 and Tr3 and the readout transistor $Tr_{readout}$ are positioned in the upper panel 200, and the pixel transistor Tr1 is formed in the lower panel 100, such that a signal coupling may be prevented from being generated in the lower panel. The light emitting elements Tr2 and Tr3 are formed in the upper panel 200 such that light sensitivity is increased, thus resulting in reliable sensing.

In an exemplary embodiment, the light emitting elements Tr2 and Tr3 and the readout transistor $Tr_{readout}$ are positioned under the upper substrate 210 such that the light emitting elements Tr2 and Tr3 and the readout transistor $Tr_{readout}$ may be prevented from being damaged by external impact.

FIG. 7 is an enlarged view illustrating a visible ray sensor Tr3 and a readout transistor $Tr_{readout}$ according to an exemplary embodiment of the present invention. The visible ray sensor Tr3 and the readout transistor $Tr_{readout}$ shown in FIG. 7 are the same or substantially the same as the visible ray sensor Tr3 and the readout transistor $Tr_{readout}$ of FIG. 6 except that the positional relationship is changed.

Referring to FIG. 7, the visible ray sensor Tr3 includes an active layer 154c, an ohmic contact layer 164c, a source electrode 173c, a drain electrode 175c, a gate insulating layer 140c, and a gate electrode 124c. The source electrode 173c and drain electrode 175c are disposed under the upper substrate 210 and separated from each other. The active layer 154c is disposed under the source electrode 173c and the drain electrode 175c and overlaps the source electrode 173c and the drain electrode 175c. The ohmic contact layer 164c is disposed between the active layer 154c and the source electrode 173c and between the active layer 154c and the drain electrode 175c. The gate insulating layer 140c is positioned under the active layer 154c, the source electrode 173c, and the drain electrode 175c. The gate electrode 124c is positioned under the gate insulating layer 140c and overlaps the active layer 154c. The readout transistor $Tr_{readout}$ is the same or substantially the same as the readout transistor $Tr_{readout}$ of FIG. 5.

The sensing device further includes a lower polarizer 12 disposed under the lower panel 100 and an upper polarizer 22 disposed on the upper panel 200. The intensity of light provided to the lower panel 100 and the upper panel 200 is controlled by using polarization characteristics of the lower polarizer 12 and the upper panel 200.

Figure 8:
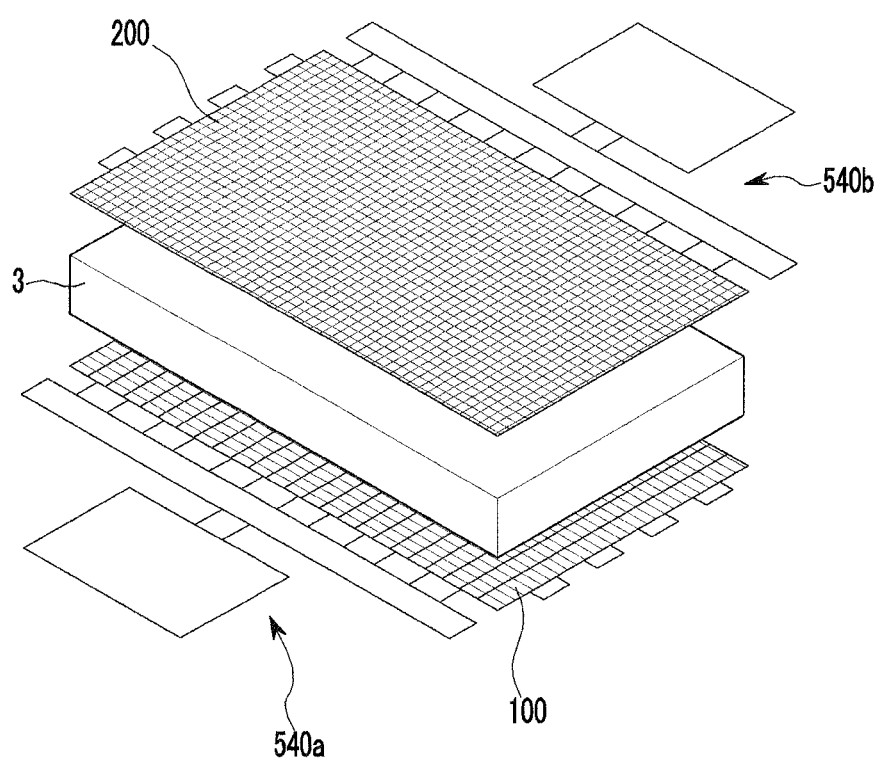

Referring to FIG. 8, the sensing device further includes a lower IC (Integrated Circuit) unit 540a electrically connected to the pixel transistor Tr1 for driving the lower panel 100 and positioned on a side of the lower panel 100 and an upper IC unit (Integrated Circuit) 540b electrically connected to the light emitting elements Tr2 and Tr3 for driving the upper panel 200 and positioned on a side of the upper panel 200.

The lower IC unit 540a and the upper IC unit 540b are positioned not to overlap each other. For example, the lower IC unit 540a and the upper IC unit 540b are positioned opposite to each other with respect to the liquid crystal layer 3.

The lower IC unit 540a is connected to the data line connected to the source electrode 173a of the pixel transistor Tr1, thereby receiving and transmitting electric signals from/to the pixel transistor Tr1. The upper IC unit 540b is connected to the data line connected to the source electrode 173b of the infrared ray sensor Tr2 or the source electrode 173c of the visible ray sensor Tr3, thereby receiving and transmitting electric signals from/to the infrared ray sensor Tr2 or the visible ray sensor Tr3. Alternatively, the upper IC unit 540b is connected to the readout line connected to the source electrode 173r of the readout transistor $Tr_{readout}$, thereby receiving and transmitting electric signals from/to the readout transistor $Tr_{readout}$.

In a liquid crystal display, the lower panel may include the pixel transistor, the photosensitive element, and the readout transistor. However, such structure may cause wiring of the lower panel to be complicated. Further, such structure may result in EMI (Electromagnetic Interference) between the IC units since the IC units connected to wires are formed on a side portion of the lower panel.

However, according to an exemplary embodiment, the lower panel 100 includes the pixel transistor Tr1, and the upper panel 200 includes the photosensitive element elements Tr2 and Tr3 and the readout transistor $Tr_{readout}$. The lower IC unit 540a is formed at a side of the lower panel 100 and separated from the upper IC unit 540b. The lower IC unit 540a does not overlap the upper IC unit 540b. Thus, EMI may be minimized.

In the above-described exemplary embodiments, the infrared ray sensor Tr2 and the visible ray sensor Tr3 are both formed in the upper panel 200, however the positions of the infrared ray sensor Tr2 and the visible ray sensor Tr3 may vary.

According to an embodiment, the infrared ray sensor Tr2 is formed in at least one of the lower panel 100 and the upper panel 200, and the visible ray sensor Tr3 is also formed in at least one of the lower panel 100 and the upper panel 200.

According to an embodiment, the infrared ray sensor Tr2 is formed in the upper panel 200, and the visible ray sensor Tr3 is formed in the lower panel 100. Alternatively, the visible ray sensor Tr3 is formed in the upper panel 200, and the infrared ray sensor Tr2 is formed in the lower panel 100.

Figure 9:
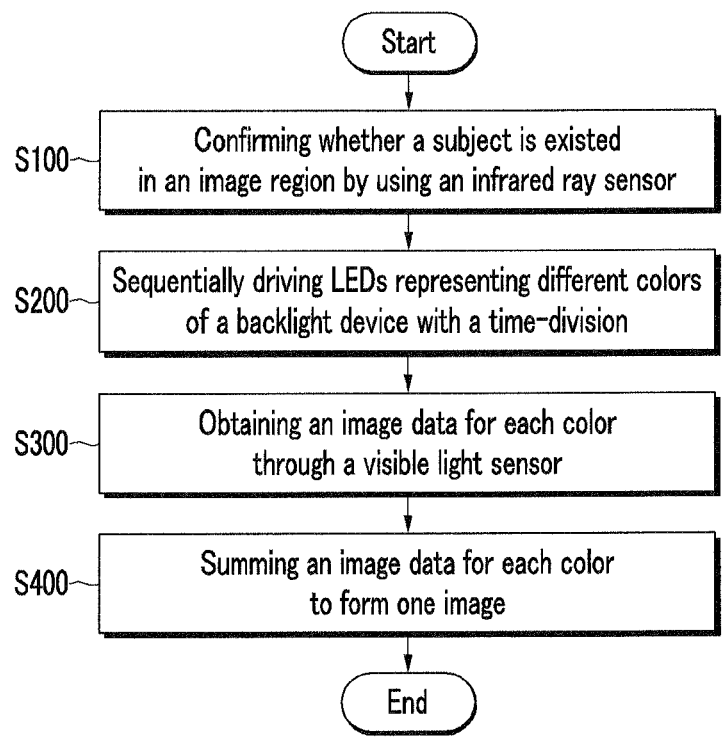
FIG. 9 is a flowchart for describing an image sensing method according to an exemplary embodiment of the present invention.

FIG. 9 is a flowchart illustrating an image sensing method according to an exemplary embodiment of the present invention.

According to an exemplary embodiment, an image of a subject is sensed by using the sensing devices shown in FIG. 1 to FIG. 8.

In an exemplary embodiment, it is determined whether a subject is located in an image region by an infrared ray sensor (S100).

When the subject is not in the image region, locating the subject in the image region is requested. When it is determined that the subject is in the image region, a color of the subject and an image of the subject are sensed by the visible light sensor.

For image sensing of the subject, a plurality of light emitting members that emit different colors in the backlight device are sequentially driven (S200).

The light emitting members include at least two of a red light emitting diode (LED), a blue light emitting diode (LED), a green light emitting diode (LED), a cyan light emitting diode (LED), a magenta light emitting diode (LED), and a yellow light emitting diode (LED). The red light emitting diode (LED), the blue light emitting diode (LED), the green light emitting diode (LED), the cyan light emitting diode (LED), the magenta light emitting diode (LED), and the yellow light emitting diode (LED) respectively include a red light emitting member, a blue light emitting member, a green light emitting member, a cyan light emitting member, a magenta light emitting member, and a yellow light emitting member.

For example, according to an embodiment, after the red light emitting diode (LED) is driven during a predetermined time, the green light emitting diode (LED) is driven and then the blue light emitting diode (LED) is driven. The red light emitting diode (LED), the green light emitting diode (LED), and the blue light emitting diode (LED) are sequentially and time-divisionally driven, so that color images may be more clearly separated.

Image data for each color is obtained through the visible light sensor (S300).

Light generated by the light emitting diodes (LED) sequentially driven passes through the lower panel 100, the liquid crystal layer 3, and the upper panel 200, and is then reflected by the subject (not shown) positioned on the upper panel 200, and is thereby sensed by the periphery visible light sensor Tr3.

For example, according to an embodiment, the red light emitting diode is driven and an image of the subject is sensed so that first image data is obtained. Then, the green light emitting diode is driven and an image of the subject is sensed so that second image data is obtained. Then, the blue light emitting diode is driven and an image of the subject is sensed so that third image data is obtained.

The image data for each color are combined, thereby forming an image (S400).

The first image data, the second image data, and the third image data obtained by time-divisionally driving a plurality of light emitting diodes (LED) are combined, thereby forming single image data. In an exemplary embodiment, white light emitting diodes (LED) are not used, and the light emitting members representing a plurality of different colors are time-divisionally driven such that color image sensing of a subject may be clearly performed.

While the embodiments of the invention have been described, it is to be understood that the invention is not limited to the disclosed embodiments, but, on the contrary, is intended to cover various modifications and equivalent arrangements included within the spirit and scope of the appended claims.

What is claimed is:

1. A sensing device comprising:
   a lower panel;
   an upper panel facing the lower panel;
   a liquid crystal layer between the lower panel and the upper panel;
   an infrared ray sensor in at least one of the lower panel or the upper panel;
   a visible light sensor in at least one of the lower panel or the upper panel; and
   a backlight device at an outer surface of the lower panel,
   wherein the backlight device includes a plurality of light emitting members configured to represent different colors and an infrared ray light emitting member, and wherein the light emitting members are time-divisionally driven.

2. The sensing device of claim 1, wherein neither the lower panel nor the upper panel includes a color filter.

3. The sensing device of claim 1, wherein the lower panel includes a pixel transistor.

4. The sensing device of claim 1, wherein the lower panel includes a black matrix, and wherein the black matrix overlaps at least one of the infrared ray sensor or the visible light sensor.

5. The sensing device of claim 1, wherein the infrared ray sensor and the visible light sensor are formed in the upper panel.

6. The sensing device of claim 1, wherein the plurality of light emitting members include at least two of a red light emitting member, a blue light emitting member, a green light emitting member, a cyan light emitting member, a magenta light emitting member, or a yellow light emitting member.

7. The sensing device of claim 1, wherein whether a subject is located in an image region is determined by the infrared ray sensor.

8. The sensing device of claim 1, wherein image data for each color is obtained through the visible light sensor by driving the plurality of light emitting members.

9. The sensing device of claim 8, wherein one image is formed by combining the image data for each color.

10. A method of sensing an image comprising:
    determining whether a subject is located in an image region;
    time-divisionally emitting different colors of light;
    obtaining image data for each of the colors; and
    combining the image data to form one image.

11. The method of claim 10, wherein the method is performed by a sensing device, wherein the sensing device includes,
    a lower panel;
    an upper panel facing the lower panel;

a liquid crystal layer between the lower panel and the upper panel;

an infrared ray sensor or a visible light sensor in at least one of the lower panel or the upper panel; and a backlight device at an outer surface of the lower panel, the backlight device including a plurality of light emitting members configured to emit the different colors of light and an infrared ray light emitting member.

12. The method of claim 11, wherein the sensing device does not include a color filter.

13. The method of claim 11, wherein the lower panel includes a pixel transistor.

14. The method of claim 11, wherein the lower panel includes a black matrix, and wherein the black matrix overlaps at least one of the infrared ray sensor or the visible light sensor.

15. The method of claim 11, wherein the infrared ray sensor and the visible light sensor are formed in the upper panel.

16. The method of claim 11, wherein the plurality of light emitting members include at least two of a red light emitting member, a blue light emitting member, a green light emitting member, a cyan light emitting member, a magenta light emitting member, or a yellow light emitting member.

17. The method of claim 10, further comprising requesting the subject to be located in the image region when the subject is not located in the image region.

18. A sensing device comprising:

a lower panel;

an upper panel facing the lower panel;

a plurality of light sensors, wherein at least one of the light sensors are formed in at least one of the lower panel or the upper panel; and a plurality of light emitting members configured to emit different wavelengths of light, wherein the light emitting members are time-divisionally driven.

19. The sensing device of claim 18, wherein the light sensors include at least one visible light sensor and at least one infrared ray sensor.

* * * * *